INVENTORS
BERNARD J. PLEISS
GUSTAV J. GOLDNER
FREDERICK H. STORCK
K. S. VASAN

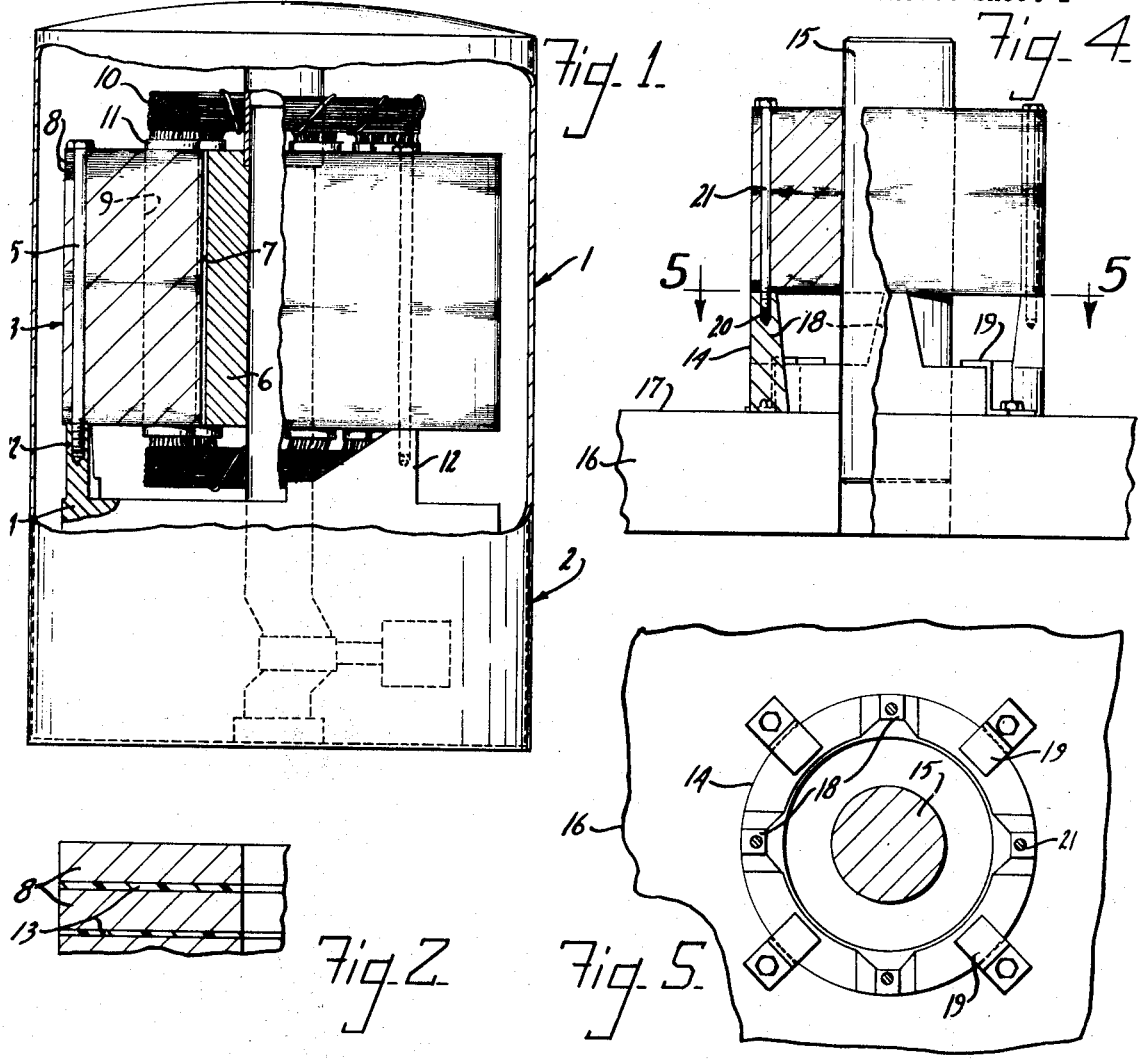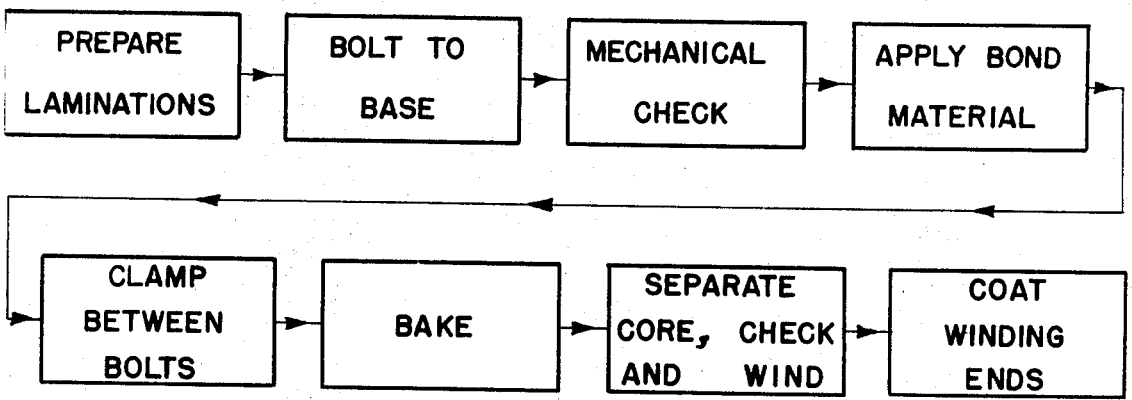
July 7, 1970     B. J. PLEISS ET AL     3,518,754
METHOD OF MANUFACTURING A MOTOR STATOR ASSEMBLY
Filed Aug. 5, 1966     2 Sheets-Sheet 1
INVENTORS
BERNARD J. PLEISS
GUSTAV J. GOLDNER
FREDERICK H. STORCK
K. S. VASAN
BY Andrus & Starke
Attorneys July 7, 1970 B. J. PLEISS ET AL 3,518,754
METHOD OF MANUFACTURING A MOTOR STATOR ASSEMBLY
Filed Aug. 5, 1966 2 Sheets-Sheet 2

BY Andrus & Starke
Attorneys

United States Patent Office 3,518,754
Patented July 7, 1970

3,518,754
METHOD OF MANUFACTURING A MOTOR STATOR ASSEMBLY
Bernard J. Pleiss, Dayton, Gustav J. Goldner, Tipp City, and Frederick H. Storck, Dayton, Ohio, and K. S. Vasan, Latham, N.Y., assignors to A. O. Smith Corporation, Milwaukee, Wis., a corporation of New York
Filed Aug. 5, 1966, Ser. No. 570,533
Int. Cl. H02k *15/00*
U.S. Cl. 29—596      10 Claims

ABSTRACT OF THE DISCLOSURE

The present disclosure relates to core bonding a laminated stator core. Laminations of a high degree of flatness are assembled over a suitable arbor and rest on a base. Bolts pass through bolt holes in the laminations and clamp the lamination to the base. Suitable varnish is applied to the outer periphery of the stack. The varnish is then removed from all exposed surfaces by a wiping operation to remove the excess bonding material. The stacked laminations are then further clamped together between the clamping bolts and the assembly is disposed in an oven and baked for a selected period.

---

This invention relates to an electric motor stator assembly and particularly to a novel and improved method of assembly and interconnecting the laminations.

Electric motors generally include an annular stationary stator within which a rotor is rotatably mounted. The stator is formed of a plurality of ring laminations suitably interconnected to form the required magnetic core with inner winding slots within which an appropriate winding is disposed with the ends of the windings disposed adjacent the end faces of the stator core.

Generally, establishing and maintaining of a preselected uniform air gap between the stator core and the rotor is of substantial significance. This requires that the laminations be interconnected as a solid square and rigid assembly. Recent developments have suggested interconnecting or bonding of the several laminations in the final assembly through a thermoplastic or thermosetting bonding material. Generally, the assembled core and winding, held in a suitable fixture and with the windings thereon, is dipped in a suitable varnish or other adhesive material to coat the windings and interconnect the laminations.

In hermetic motors where the stator assembly is clamped directly to the compressor housing under relatively high compressive forces, the high temperatures encountered have a tendency to establish thermoplastic flow of the bonding material. Any such flow would reduce the mounting compression level and with a resulting degradation in the uniformity of the air gap within the motor or between the stator and the rotor. This is true because the highly accurate radial location of the stator core with respect to the rotor is maintained only by the compressive force of the mounting bolts. Nonuniformity in the air gap or lack of concentricity between stator and rotor results in a reduced starting torque and therefore difficulty in starting of the compressor.

The present invention is particularly directed to a highly improved core bonding process with a resulting improved core stator structure which provides a solid, square and rigid assembly under operating conditions including those encountered in the conventional compressor motor assembly.

Generally, in accordance with the present invention, the initial laminations are formed in such a manner as to provide a relatively high degree of flatness. The laminations are assembled over a suitable arbor and rest on a stator assembly base with lamination bolt holes aligned with corresponding tapped attachment holes in the stator assembly base and clamped thereto by through bolts passing through the bolt holes and clamping the lamination to the base at a selected pressure level. The face runout of the assembled base and stacked laminations is checked to make sure that it falls within a predetermined tolerance. A coating of bonding material or other suitable varnish is then applied to the outer surface of the laminations preferably through suitable automatic machinery such as brush or roller means. The varnish is then removed from all exposed surfaces by a wiping operation to remove the excess bonding material. The stator assembly base and the stacked laminations are then further clamped together between the clamping bolts by suitable clamp members on the opposite ends thereof. The clamped assembly is disposed in an oven and baked for a selected period.

Thereafter, the core is separated from the assembly base, and the core is separately wound and insulated in the conventional manner with the slot liners projecting outwardly of the stator assembly. The assembled unit or the windings are then further insulated by dipping the end turns only of the final assembly into a suitable thermoplastic or varnish insulating liquid. It is a highly important feature of the present invention that the liquid is extended over the end turns and the outer end portions of the cuffs of the slot liners only and is not permitted to collect on the face of the stator iron core. This prevents the liquid from entering the clamping bolt holes.

The present invention provides a novel stator unit and a highly improved method of providing a bonded stator unit which can be operated under high compressive mounting forces and at relatively high temperatures.

The drawings furnished herewith illustrate a preferred construction of the present invention in which the above advantages and features are clearly disclosed as well as others which will be clear from the following description of the preferred embodiment.

In the drawings:

FIG. 1 is a view of a compressor including a stator constructed in accordance with the present invention;

FIG. 2 is a fragmentary enlarged view of a stator core;

FIG. 3 is a flow diagram showing the complete steps employed in the method of forming and assembling the improved stator core;

FIG. 4 is a view showing the first step in the method of assembling the stator cores;

FIG. 5 is a view taken on line 5—5 of FIG. 4;

Figure 6:
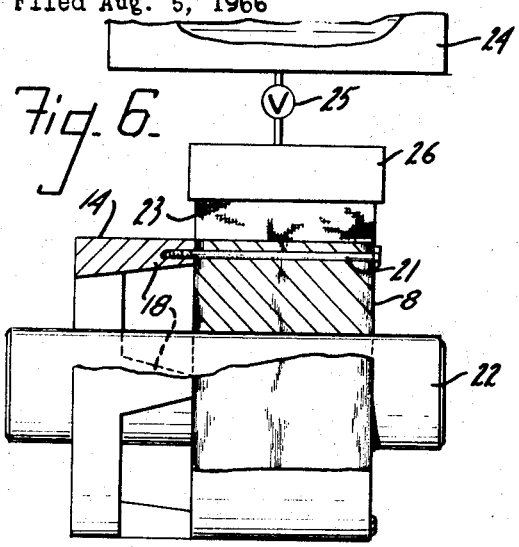
FIG. 6 is a view showing the application of the bonding material to the stator core.

Generally, in the illustrated embodiment of the invention, a motor 1 is mounted as a part of a compressor 2. The motor 1 includes an annular stator unit 3 mounted directly on the compressor casting or housing 4 and held thereto by the suitable mounting bolts 5. A rotor 6 is rotatably mounted within the stator unit 3 and journaled within suitable fixed bearings, not shown, to provide precise alignment of the rotor 6 within the annular stator unit 3 with a predetermined air gap 7 therebetween.

The present invention is particularly directed to forming of the stator unit 3 which generally includes a plurality of similar individual ring laminations 8 stacked to form a core. Each of the laminations 8 is provided with corresponding winding notches or slots 9 on the inner periphery to receive a winding 10. The stator winding 10 is wound in known manners within the winding slots with suitable slot insulators 11 disposed in the slots and projecting slightly outwardly thereof to the opposite end faces of the stator core. The stator core rests directly on the compressor housing 4 and is tightly clamped thereto by the plurality of through bolts 5 which extend through suitable through openings in the outer diameter of the core and into corresponding threaded openings 12 in the housing 4.

The stator laminations 8 in accordance with the present invention are interconnected by a bonding material 13 on the interfaces of the laminations. As previously noted, the stator core is secured to the housing 4 under relatively high compressive forces to provide accurate location of the stator core with respect to the rotor 6 in order to maintain a uniform concentric arrangement. This maintains a constant uniform air gap 7 between the stator core and the rotor 6 to provide the desired and necessary starting torque over long periods of time as long as the lamination 8 and particularly the material or coating 13 remains in tact.

In order to prevent flow of the bonding material under the compressive mounting force established by the mounting bolts 5 at operating temperature and consequently holding uniformity of the air gap, the stator core is constructed in accordance with the following teaching constituting the subject matter of the present invention.

Generally, the steps in the assembly are as shown in the flow diagram of FIG. 3. The individual laminations 8 are preferably suitably degreased, annealed and blued. The laminations should be essentially flat and blued for best results. The flatness is important to prevent undue runout of the stacked unit and the bluing produces a relatively heavy scale on the surfaces of the laminations.

The laminations 8 are stacked and clamped to an assembly base 14 at circumferential spaced locations with an aligning arbor 15, as shown in FIG. 4. The third step consists of checking the stack length and face runout of the assembly after which the bonding material is applied to the subassembly of FIG. 4. Thereafter the coated unit is further clamped together and then disposed within a suitable oven and baked at a selected temperature for a predetermined time period. The stator core is then disassembled from the supporting fixtures, checked mechanically and electrically, and then wound in the usual manner.

As most clearly shown in FIGS. 4 and 5, the initial assembly after suitable treatment of the laminations 8 includes providing an assembly table or support 16 having a flat mounting surface 17. The locating arbor 15 projects upwardly from the parallel or the flat surface with a precise 90 degrees between the flat surface 17 and the cylindrical arbor 15. The stator assembly base 14 is disposed over the arbor 15.

The illustrated assembly base 14 is an annular member having a ring-shaped lower portion from which four parallel arms 18 project upwardly, terminating in a common plane. The back face of the lower portion and the ends of the arms 18 are specially finished to be flat and parallel to a high degree and in a practical application within .001 TIR. Clamping brackets 19 are bolted to the table 16 and include arms overlying the base 14 between the arms 18 to firmly clamp the base to the support. As a result, the outer ends of the arm provide a surface at 90° to the arbor.

After the placement of the base 14 over the arbor 15, the selected stack of laminations 8 are placed on the arbor and rest on the flat parallel surfaces of the upstanding arms 18. The arbor 15 is provided with a diameter essentially equal to that of the inner diameter of the core laminations 8 to accurately locate the laminations in superposed relation. The laminations 8 are assembled on the arbor with bolt holes aligned with each other and with correspondingly tapped openings 20 in the outer ends of the arms.

Clamping bolts 21 are then extended through the bolt holes in the laminations 8 and threaded into the tapped openings 20. The bolts 21 are drawn up to establish a selected clamping torque.

The brackets 19 are then released and the assembly of laminations 8 and base 14 is removed. The core is checked for length and face runout; that is, the flatness of the end face of the assembly.

The assembly of core and base is mounted to have the bonding material applied to the outer peripheral surface of the core. A particularly satisfactory method is shown in FIG. 6. As shown therein, the assembly is mounted on a rotating shaft member 22. A felt pad 23 having a width essentially corresponding to that of the axial length of total laminations 8 is aligned with and bears on the periphery of the laminations. A bonding liquid source 24 is connected by a metering valve 25 to a distributor secured to the pad 23. Rotation of the subassembly continuously applies the adhesive material or the like to the exposed outer surfaces of the laminations 8.

The bonding liquid penetrates completely between the lamination as a result of capillary action and coats the faces of the laminations.

Figure 7:
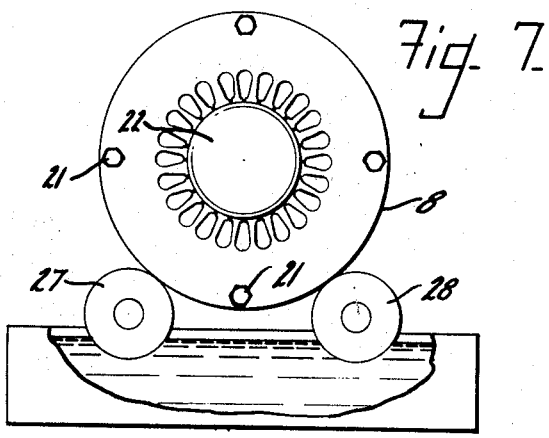
FIG. 7 is a view showing an alternative method of applying a bonding material.

In the broadest aspects of the invention, the material can be otherwise applied. For example, in FIG. 7, the core is supported on suitable rotating sponge rubber rollers 27 and 28. Rotation of the rollers 27 and 28 causes the lower surface of the rollers to continuously pass through a suitable bonding material and transport it to the surface of the supported core. In turn, the rotation of the rollers 27 and 28 also simultaneously causes rotation of the core to insure application to the outer periphery of the stator.

After a selected time period sufficient to insure adequate penetration of the bonding liquid, the subassembly is removed from shaft 22 and all excess liquid wiped or otherwise removed from all of the faces and exterior surfaces of the core and the base. A mist of air and varnish solvent is then preferably sprayed on the face of the core and wiped off with a dry towel member or the like.

Figure 8:
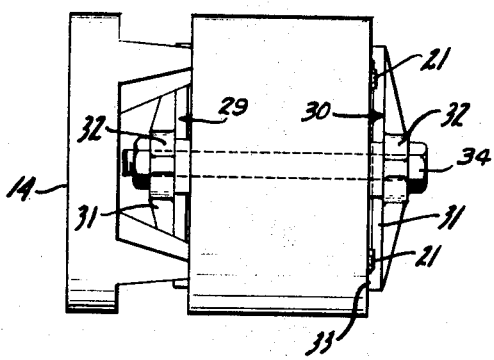
FIG. 8 is a view showing a clamping assembly for baking of the core.
Figure 9:
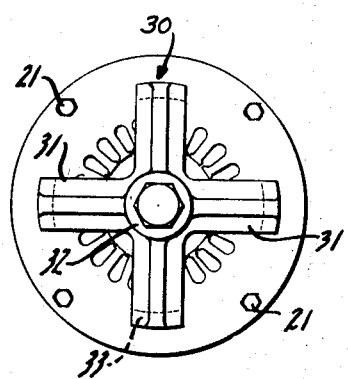
FIG. 9 is an end view of FIG. 8.

After removal of the excess liquid, the subassembly is further clamped between a pair of similar clamp members 29 and 30, such as shown in FIGS. 8 and 9. Generally, each clamp member is spider-shaped having perpendicularly projecting arms 31 extending from a central apertured hub 32. The outer ends of the arms are provided with slight raised embossments 33. The clamp members 29 and 30 are assembled to the opposite ends of the stator core with the raised arm embossments 33 engaging the end face or laminations of the core and with the arms 31 generally centrally located of the clamping bolts 21. The clamps 29 and 30 are constructed to permit insertion of clamp 20 between the clamping legs of base 14. A clamping bolt 34 is then passed through the central openings in the hubs 32 to the clamp members and drawn up to restrict the total flare between laminations to a selected degree. This second subassembly is then disposed within a suitable oven or other baking mechanism and the subassembly is raised to a selected working temperature where it is held for a predetermined period of time to completely set the bonding liquid to thereby bond the laminations to each other and provide a bonded core.

Thereafter, the bonded core is disassembled from the clamp members 29 and 30 and the stator assembly base 14 and again given suitable mechanical and electrical checks.

Thereafter, the slot liners 11 and the winding 10 are assembled with the stator core in accordance with the usual practice.

The present invention has been found to provide a highly improved stator unit particularly for compressor mounting applications wherein the compressive mounting of bolt mounting of the stator unit is relied on to maintain a uniform air gap with respect to the rotating rotor. The method of assembly requires a minimum amount of capital while permitting ready assembly. The checking and development of the stator squareness after the assembly and immediately prior to the dipping reduces the difficulties encountered in adhesive bonding of laminations. It has been found that this method of assembly greatly minimizes and essentially eliminates any thermoplastic flow under the compressive mounting forces encountered and the normal temperature of 300° F.

As previously noted, the particular form of clamping members employed, the method of applying the bonding material and the like may vary within the broadest aspects of this invention. The particular detailed methods have been found to be highly satisfactory and will generally provide optimum results. For example, the base may be a solid ring-like member with the stacked laminations secured to one face.

Various modes of carrying out the invention are contemplated as being within the scope of the following claims particularly pointing out and distinctly claiming the subject matter which is regarded as the invention.

We claim:
1. A method of forming an annular core for use in a dynamoelectric machine wherein the core is mounted by a plurality of circumferentially spaced clamping members, said core being composed of a plurality of laminations having a bore with winding accommodating slots, comprising the steps of
   stacking the laminations with the slots aligned,
   clamping the stacked laminations to a planar surface on a base member at a first plurality of circumferentially spaced locations corresponding to the mounting members,
   applying a bonding medium to said laminations and the base by rotating of the stacked laminations and base about the axis of the laminations and applying the bonding liquid to essentially only the complete outer peripheral surface of the laminations while rotating of the lamination, said medium flowing as a result of capilliary action between and covering the interfaces of the laminations,
   setting said bonding medium, and
   separating the stacked laminations from the base.

2. The method of claim 1 including the step of clamping the laminations together between said first locations after application of the bonding medium.

3. The method of claim 1 including the step of checking the physical characteristic of the laminations after clamping to the base and before applying the bonding medium.

4. The method of claim 1 wherein said core laminations include a plurality of circumferentially spaced and aligned mounting bolt openings extending axially through the outer portion of the laminations, and said laminations are secured to the base by bolt members passing through said openings, said base having a plurality of clamping arms aligned with the openings and tapped to receive the bolt means, said clamping arms extending outwardly and exposing the end face of the laminations between said arms and wherein the step of assembling spider clamp members to the opposite faces of the stacked laminations secured to said base and interconnecting said clamp members to compress said laminations, said clamp members having arms engaging the laminations intermediate said openings.

5. The method of claim 1 including the step of preparing the laminations prior to stacking including bluing the individual laminations.

6. The method of claim 2 wherein only essentially completely flat laminations are stacked.

7. The method of claim 1 including the steps of wiping the bonding medium from the outer surfaces of the laminations, spraying the end faces of the laminations with a solvent, and wiping the solvent from the end faces.

8. The method of claim 1 including the additional steps of inserting slot liners in the slots of the core, said slot liners extending axially of the end faces of the core, and applying a winding to the core with end winding portions.

9. The method of claim 1 wherein the bonding liquid is applied by continuously wiping an upper zone of the laminations with a felt pad saturated with the bonding liquid.

10. A method of forming an annular core for use in a dynamoelectric machine wherein the core is mounted by a plurality of circumferentially spaced clamping members, said core being composed of a plurality of laminations having a bore with winding accommodating slots, comprising the steps of
   stacking the laminations with the slots aligned,
   clamping the stacked laminations to a planar surface on a base member at a first plurality of circumferentially spaced locations corresponding to the mounting members,
   applying a bonding medium to said laminations and the base, said medium flowing between and covering the interfaces of the laminations,
   clamping the laminations together between said first locations after application of the bonding medium,
   setting said bonding medium, and
   separating the stacked laminations from the base.

References Cited

UNITED STATES PATENTS

| | | | |
|---|---|---|---|
| 1,058,439 | 4/1913 | Karp | 118—219 X |
| 2,304,607 | 12/1942 | Sleeter | 29—596 |
| 2,367,428 | 1/1945 | Prat Divi | 29—598 X |
| 2,423,869 | 7/1947 | Blessing. | |
| 2,868,403 | 1/1959 | Mattingly et al. | 118—219 X |
| 3,299,304 | 1/1967 | Hull | 310—217 |

JOHN F. CAMPBELL, Primary Examiner

C. E. HALL, Assistant Examiner

U.S. Cl. X.R.

29—609; 118—219; 310—216, 217